(12) United States Patent
Rulkens

(10) Patent No.: US 6,762,849 B1
(45) Date of Patent: Jul. 13, 2004

(54) METHOD FOR IN-SITU FILM THICKNESS MEASUREMENT AND ITS USE FOR IN-SITU CONTROL OF DEPOSITED FILM THICKNESS

(75) Inventor: Ron Rulkens, Milpitas, CA (US)

(73) Assignee: Novellus Systems, Inc., San Jose, CA (US)

(*) Notice: Subject to any disclaimer, the term of this patent is extended or adjusted under 35 U.S.C. 154(b) by 121 days.

(21) Appl. No.: 10/176,118

(22) Filed: Jun. 19, 2002

(51) Int. Cl.⁷ .............................. G01B 9/07; G01B 4/28
(52) U.S. Cl. ...................................... 356/630; 356/503
(58) Field of Search ................................ 356/503, 630, 356/632, 492, 485

(56) References Cited

U.S. PATENT DOCUMENTS

| | | |
|---|---|---|
| 5,308,414 A | 5/1994 | O'Neill et al. |
| 5,450,205 A | 9/1995 | Sawin et al. |
| 5,754,297 A | 5/1998 | Nulman |
| 6,129,807 A | 10/2000 | Grimbergen et al. |
| 6,226,086 B1 | 5/2001 | Holbrook et al. |
| 6,570,662 B1 * | 5/2003 | Schietinger et al. ........ 356/630 |

* cited by examiner

Primary Examiner—Frank G. Font
Assistant Examiner—Patrick Connolly
(74) Attorney, Agent, or Firm—DeLio & Peterson, LLC; Kelly M. Reynolds, Esq.

(57) ABSTRACT

A method and system for real-time, in-situ measurement of a film being deposited onto a surface of a wafer in a tool during semiconductor, optical component and electro-optic component processing and manufacturing. The method and system include real-time, in-situ detecting and analyzing radiation within the tool which is reflected off a wafer surface and subsequently diffusely reflected off internal roughened surfaces of the processing chamber. The emitted radiation may be derived from the plasma within the chamber, or alternatively, an external energy source. In detecting and analyzing the radiation reflected off the internal surfaces of the processing tool, the instant method and system monitors the deposition process of the film and automatically controls the deposition of such film in response to the measurements taken.

36 Claims, 5 Drawing Sheets

METHOD FOR IN-SITU FILM THICKNESS MEASUREMENT AND ITS USE FOR IN-SITU CONTROL OF DEPOSITED FILM THICKNESS

BACKGROUND OF THE INVENTION

1. Field of the Invention

This invention relates to the fields of semiconductor, optical component and electro-optic component processing and manufacturing, and in particular, to a method and apparatus for in-situ monitoring and controlling deposited film thicknesses in real-time.

2. Description of Related Art

In semiconductor manufacturing, the fabrication processes that are used to date must be very accurately controlled due to the constant increase in integration density of the resultant integrated circuit. One of the important process steps in semiconductor processing, as well as in other types of device processing, is the deposition of films, such as those formed into interconnect lines, bus structures, Schottky barriers, ohmic contacts or other device structures.

Appropriate thickness of the deposited metal film is imperative to the performance of the resultant device. The thickness of the film must be precisely controlled because variations in thickness may affect the electrical properties of the layers and adjacent device patterns, particularly in the interconnections between different layers of microelectronic devices. For example, if too thin a metal film is deposited, an interconnect line formed from that film may be unacceptably resistive or may have a greater likelihood of becoming an open circuit either during subsequent processing steps or during the normal operation of the device. A thick metal film is also undesirable as the film deposition process takes too long and the film thickness may be in excess of the tolerances of later processing steps. Accordingly, it is desirable to maintain film thicknesses near their optimal levels.

In so stating, tools used for such semiconductor manufacture processing have becoming more and more complex over the years. For example, typical processing tools may include a plurality of chambers, whereby each chamber runs a number of varying processing steps. A wafer is sequentially introduced within each of the plurality of chambers and processed sequentially therein, generally under the control of a computer. Typically, the deposition monitoring techniques within such chambers are often performed using repetitive techniques and generally require test wafers. The film thickness is generally measured on one or more of the test wafers, after the film has been deposited thereon, to determine if the film thickness is near an optimal level and if the process is within normal operating parameters. If the measured film thickness and parameters are not within the desired tolerances, the process parameters are adjusted and more test wafers are measured to assure optimal film thickness and process compliance. These processes have a number of disadvantages including, for example, being costly as one or more test wafers must be utilized, time consuming as the film thickness must be measured after the film is deposited thereon, unreliable from wafer-to-wafer and inefficient compared to current deposition monitoring techniques.

Accordingly, as variations of certain process variables cannot be accurately predicted over the course of many process runs using the above systems, new methods for tool and process characterization such as gas analysis, in-situ monitoring and the like, are now of common use in the semiconductor industry. Further, external film thickness metrology, located outside of the wafer processing tool, typically is used as a film thickness monitor. However, as it is advantageous to monitor the progress of critical wafer processing steps to ensure that the steps are properly completed, it is desirable to utilize in-situ process monitoring systems. In-situ monitoring systems improve both process monitoring as well as control of the processing steps based on such process monitoring.

In-situ monitoring systems have been developed to monitor and control the deposition of a film onto a wafer surface, as well as for film removal systems such as those for detecting an endpoint of a process. The endpoint determination is used to monitor the progress of the process and/or to control the process, such as by automatically terminating the specific processing operation being monitored. In film removal systems and processes, it must be accurately determined when enough of the film has been removed; i.e., to detect the endpoint of the removal operation. If an etch step exceeds the predetermined endpoint, the substrate, insulating layer and/or resultant circuit pattern may be damaged. As such, these systems typically rely on in-situ measurements to determine the progressive depth of the etch process as these systems provide greater control of the etch process and improve uniformity over a batch of processed wafers.

There has been some success in the art of developing in-situ film thickness deposition and etch depth measuring systems that utilize optical emission spectroscopy to monitor light emissions from the plasma as the etch process progresses. Such a system may monitor the optical emission intensity of the plasma in a narrow band as well as a wide band and generates signals indicative of the spectral intensity of the plasma by collecting the optical emissions using an optical fiber. When the signals diverge, a termination signal is generated thereby terminating the etch process. However, such systems typically require a separate light source, the measurement is done on spots on the wafer, and in the case where multiple spots need to be measured at least part of the measurement equipment needs to be duplicated for such measurement as well as the computation time increasing. As such, these methods and technologies for film thickness determinations are slow, costly, inefficient, unreliable and negatively impact production yield. Other techniques include the use of laser interferometry, beamsplitters and diffraction gratings to measure the phase shift of a laser beam reflected from two closely spaced surfaces. For example, the phase shift between a first beam reflected off the mask pattern and the beam reflected off an etched portion of the wafer is measured and compared to a predetermined phase shift that corresponds to the desired etch depth. Unfortunately, the above discussed optical emission spectroscopy and other monitoring and measuring systems are plagued by inadequate signal to noise ratios to achieve in-situ or real time data processing, as well as the minimum etch depth being limited by the wavelength of the light source used in the monitor. Also, the film thickness or film thickness change is typically measured at a fixed spot, such as a fixed spot on a wafer. Disadvantageously, the overall film thickness across the wafer is unknown as only the thickness at that measured spot is determined, thus leading to an increased risk of detecting film thickness from the incorrect location where features of the film thickness may not be representative for the entire wafer. Furthermore, these systems often have the disadvantage of requiring substantial modification of the conventional equipment and processes thereby making them undesirable, expensive, time consuming, difficult to integrate, inefficient and impracticable.

Accordingly, a need continues to exist in the art for low cost improved systems and methods for accurately and directly measuring, monitoring and controlling film deposition thickness across the entire wafer surface within a deposition tool whereby the deposited material is uniform from wafer to wafer.

Bearing in mind the problems and deficiencies of the prior art, it is therefore an object of the present invention to provide an improved low-cost method and system for direct, real-time measurement of thickness of deposited film during the deposition process.

Another object of the present invention is to provide a method and a system for real-time, in-situ wafer fabrication processes that prevents misprocessing errors, corrects for process drifts and detection of incorrect tool operation by real-time detection of deposited film thickness during wafer processing by detecting unusual signal behaviors of the system hardware or processing problems that would negatively affect the film measurement.

It is another object of the present invention to provide a method and a system for real-time, in-situ wafer fabrication processes that significantly reduce the wafer reworking.

Yet another object of the present invention is to provide a method and a system for real-time, in-situ wafer fabrication processes that drastically reduce processing costs, processing time and wafer waste.

Still another object of the present invention is to provide a method and a system for a real-time, in-situ wafer fabrication process whereby the deposition process may be stopped at an exact moment when the deposited film has reached a desired thickness.

Yet another object of the invention is to provide a method and a system for real-time, in-situ wafer fabrication processes that actively, in real-time, recognize the type wafer for depositing the desired film and film thickness thereon a surface of such wafer.

A further object of the invention is to provide a method and a system for real-time, in-situ wafer fabrication processes including processing tools having low costs and simplicity of such tools associated therewith.

Another object of the present invention is to provide a method and a system for a real-time, in-situ wafer fabrication process that obviates the need for human control for better automation.

Still other objects and advantages of the invention will in part be obvious and will in part be apparent from the specification.

SUMMARY OF THE INVENTION

The above and other objects, which will be apparent to those skilled in art, are achieved in the present invention which is directed to, in a first aspect, a method for measuring film thickness on a substrate in a processing chamber both in real-time and in-situ. The method includes providing a processing chamber having roughened internal surfaces and emitting a radiation within the processing chamber whereby the radiation is directed toward and contacts a wafer surface having a film being processed thereon. The radiation is reflected off the wafer surface and directing toward and contacts the roughened internal surfaces. The radiation then diffusely reflects off the roughened internal surfaces and is collected to measure a thickness of the film being processed thereon the wafer surface. The roughened internal surfaces may have a variety of shapes including dome-shaped, hemispherical, cylindrical, oval, square, cylindrical square, cylindrical parabolic and combinations thereof.

In the invention, the processing chamber may comprise a material having a naturally occurring surface roughness to provide the roughened internal surfaces. Alternatively, the roughened internal surfaces may be provided by a method including grinding, polishing, sand blasting, etching, and machining the internal surfaces of the processing chamber. Still further, the roughened internal surfaces may be provided by conformally coating internal surfaces of the processing chamber with a material having a naturally occurring roughness.

The at least one optical view port may be provided at any location along a perimeter of the processing chamber for collecting the radiation diffusely reflected off the roughened internal surfaces to measure the thickness of the film. The optical view port has roughened internal surfaces to randomize directionality of incident radiation resulting in diffusely reflected radiation. In accordance with the invention, the at least one optical view port may comprise a window retracted into a small opening located at any location along the perimeter of the processing chamber. Alternatively, the at least one optical view port may include a fine metal mesh screen over an internal surface of the at least one optical view port to prevent deposition of the film thereon the internal surface of the at least one optical view port.

In the first aspect, the film being processed may include depositing a film thereon the wafer surface, or alternatively, etching a deposited film thereon the wafer surface. The radiation may be emitted from a plasma generated within the processing chamber, or alternatively, the radiation may be emitted into the processing chamber from an external radiation source.

In a second aspect, the invention discloses a method for measuring a deposited film thickness on a substrate in a deposition chamber both in real-time and in-situ. The method includes providing a processing chamber having roughened internal surfaces, at least one optical view port at any location along a perimeter of the processing chamber and a radiation source. A radiation is emitted within the processing chamber from the radiation source whereby the radiation is directed toward and contacts a wafer surface having a film being deposited thereon. The radiation is reflected off the wafer surface and directing toward and contacts the roughened internal surfaces. The radiation then diffusely reflects off the roughened internal surfaces and is collected using the at least one optical view port. A thickness of the film across the wafer surface is then analyzed based on the collected diffuse radiation. The processing chamber may comprise a deposition tool including a physical vapor deposition, a chemical vapor deposition, a plasma enhanced chemical vapor deposition and a high density plasma deposition. The processing chamber may also comprise a plasma etching or plasma cleaning tool.

In the second aspect, the degree of roughness average of the roughened internal surfaces at least equals a wavelength of the deposited film. The at least one optical view port may be located below the wafer surface for collecting the diffusely reflected radiation. Further, the at least one optical view port may comprise a material including sapphire, alpha-alumina and yttrium aluminum garnet. Optionally, the second aspect may further include a plurality of optical view ports located at a variety of locations along the perimeter of the processing chamber both above and below the wafer surface.

In accordance with the invention, the radiation source may comprise a plasma generated within the processing chamber including, for example, helium, neon, argon, krypton, xenon, oxygen, fluorine, nitrogen, nitrogen monoxide, carbon monoxide, chlorine, bromine, hydrogen and silicon, or ions thereof. Alternatively, the radiation source may comprise an external radiation source emitting radiation into the processing chamber including, for example, ultra violet, visible, X-Ray and near infrared radiation source. The deposited film may include, for example, silicon oxide, fluorinated silicon oxide, phosphorus doped silicon oxide, boron doped silicon oxide, diamond-like carbon, polymers, silicon nitride, titanium nitride, tantalum nitride and carbon nitride deposited to a thickness ranging from about 50 Å to about 20,000 Å. The collected diffuse radiation may have a wavelength ranging from about 0.1 nm to about 5000 nm. The thickness of the film across the wafer surface is analyzed by calculating, in parallel, a plurality of wavelengths from a plurality of emissions reflecting off the wafer surface and diffusely reflecting off the roughened internal surfaces.

In a third aspect, the instant invention is directed to a processing chamber for measuring film thickness on a substrate in real-time and in-situ. The processing chamber includes a chamber body with roughened internal surfaces, at least one optical view port located at any location along a perimeter of the chamber body and a radiation source. In the processing chamber the radiation is emitted from the radiation source, reflected off a wafer surface and secondarily and diffusely reflected off the roughened internal surfaces of the chamber body whereby the diffusely reflected radiation is collected by the at least one optical view port to measure a thickness of a film across the wafer surface. The radiation source may comprise a plasma generated within the chamber body, or alternatively, an external radiation source emitting radiation into the chamber body.

In accordance with the third aspect, the roughened internal surfaces of the chamber body may be dome-shaped, hemispherical, cylindrical, oval, square, cylindrical square, cylindrical parabolic and combinations thereof. The chamber body may comprise a material having a naturally occurring surface roughness to provide the roughened internal surfaces, or alternatively, the roughened internal surfaces may comprise a material having a naturally occurring surface roughness conformally coating on internal surfaces of the chamber body.

The at least one optical view port may have roughened internal surfaces to randomize directionality of incident and the diffusely reflected radiation, or alternatively, may comprise a window retracted into a small opening located at any location along the perimeter of the chamber body. The optical view port may further include a fine metal mesh screen over an internal surface thereof to prevent deposition of the film on an internal surface of the view port. Optionally, a plurality of optical view ports may be provided whereby they are located at a variety of locations along the perimeter of the chamber body, both above and below the wafer surface.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
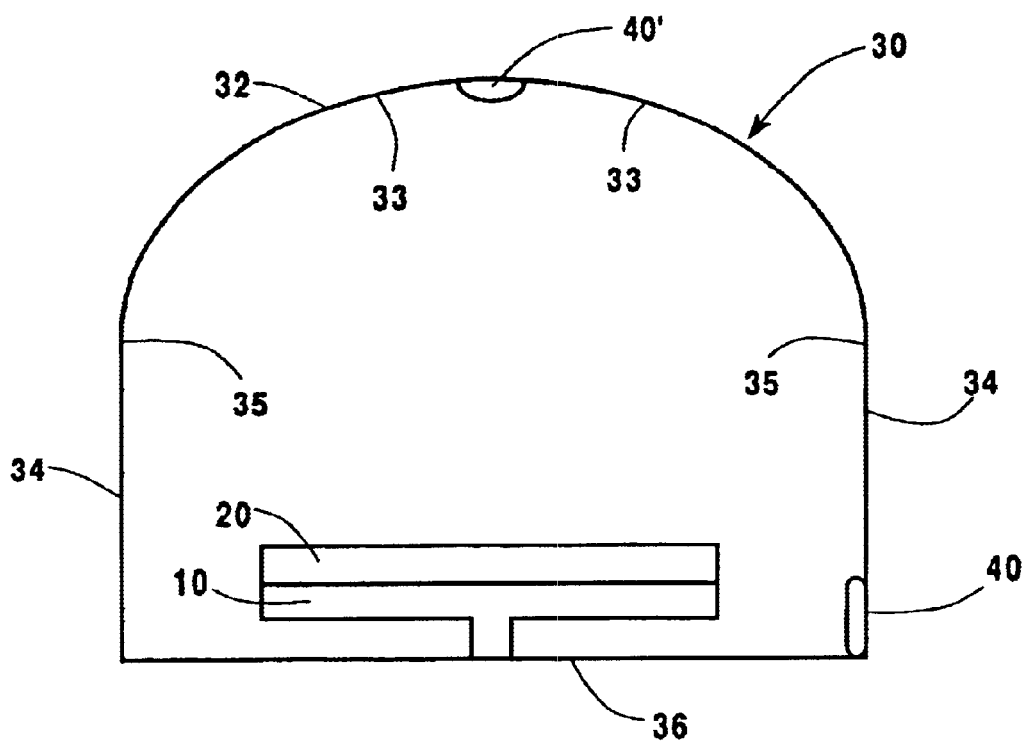
FIG. 1 illustrates a processing chamber in accordance with the invention whereby the processing chamber has roughened internal surfaces for secondarily and diffusely reflecting radiation reflected from a surface of a wafer having a film being deposited thereon and having a plurality of view ports at varying locations for detecting the diffusely reflected radiation.

In describing the preferred embodiment of the present invention, reference will be made herein to FIGS. 1–7 of the drawings in which like numerals refer to like features of the invention.

The instant invention solves the above problems in the prior art by providing a reliable and efficient method and apparatus for depositing a film on a wafer whereby such deposited film thickness is uniform from wafer to wafer. The wafers made in accordance with the invention, i.e., having uniform film thickness deposited on surfaces thereof, provide for reliable and easy subsequent processing steps in the production of the resultant semiconductor chip. The invention provides in-situ monitoring of deposited film thickness having a close loop control of deposited film thickness whereby a desired thickness of the film, with an acceptable but non-specified error, is deposited for every wafer provided within the deposition chamber. The invention advantageously measures, monitors and controls, in real-time, the film deposition across the entire wafer surface by detecting and analyzing radiation secondarily and diffusely reflected off roughened internal surfaces of a deposition tool to obtain the average film thickness across the wafer, all without requiring any direct line-of-sight.

In so doing, the invention uses a radiation source, preferably emitted from a plasma formed within the deposition chamber, in combination with roughened internal surfaces of a deposition chamber as a reflecting surface to perform simultaneously both real-time in-situ measuring of a deposited film thickness and in-situ control of such deposited film. Optimally, the radiation emitted from the plasma is reflected off the deposited film as the film thickness increases and goes through phases. Optionally, the deposited film may absorb the radiation emitted from the plasma. In accordance with the invention, the radiation intensity increases and decreases in a sinusoidal pattern with a decaying amplitude versus time. The film thickness may be calculated from the shape of the radiation intensity-versus time curve whereby such calculations may be done for one wavelength, or alternatively, in parallel for a plurality of emissions for increased measurement accuracy across the wafer.

Thus, the various aspects of the present invention provide real-time, in-situ measurement of a film being deposited onto a surface of a wafer, or other substrate, within a processing chamber by detecting and analyzing plasma emitted radiation reflected off a wafer surface, or substrate surface, and diffusely reflected off internal roughened surfaces of the processing chamber for both monitoring the deposition process of the film and automatically controlling the deposition of such film in response to the measurements taken. The roughness of the internal surfaces of the chamber eliminates any signal arising from the etching or depositing of the film onto or off the chamber surface.

The instant invention will be easier understood in accordance with the description below referring to FIGS. 1–7.

Referring to FIG. 1, a wafer 20 is provided on a support pedestal 10 for vertical movement of the wafer after delivery by a robot within a plasma deposition chamber 30. The reaction chamber 30 may comprise a deposition chamber including those used to deposit and/or etch an active plasma such as a physical vapor deposition (PVD), Chemical Vapor Deposition (CVD), Plasma Enhanced Chemical Vapor deposition (PECVD), High Density Plasma deposition (HDP) and the like. Alternatively, the reaction chamber 30 may comprise a plasma etching or plasma cleaning tool. The reaction chamber 30 has a top portion 32 attached to chamber sidewalls 34 which are directly attached to a bottom surface of the chamber body. The top portion 32 of the chamber body is directly over a wafer 20 provided within the chamber body. In the invention, the top portion 32 may comprise internal and external surfaces having a variety of shapes suitable to build such reactors including, but not limited to, dome-shaped, hemispherical, cylindrical, oval, square, cylindrical square or parabolic and the like.

In accordance with the invention, the internal surfaces of the chamber body 30 have sufficiently roughened internal surfaces to randomize an angle of reflection, or angles orientation at a variety of differing positions, relative to an incoming radiation 64 reflected off the wafer surface. Roughness is particularly important on the internal chamber surface above the area where the plasma radiation is present. The degree of roughness average ("Ra") depends in part on the radiation utilized for the measurement of the deposited film and must be equal to, or alternatively larger than, the wavelength used for such film measurement. For example, wherein an optical emission of 0.2 µm is used for measuring the film thickness, the degree of roughness average of the internal chamber surfaces must be equal to or larger than 0.2 µm Ra. The instant invention may be used in viewing any wavelength of radiation, however, radiation with a wavelength varying from about 0.1 nm to about 5000 nm, optimally 190 nm to about 2000 nm, is preferred whereby the films are deposited onto the wafer surface to a thickness ranging from about 50 Å to about 20,000 Å.

As shown in FIG. 1, within the chamber body 30, an internal surface 33 of top portion 32, i.e., above the wafer 20, and internal surfaces 35 of the chamber sidewalls 34 have roughened surfaces. In providing the internal roughened surfaces 33 and 35, the chamber body 30 may be made of a material having a naturally occurring roughness, i.e., having a sufficiently rough surface as-is, such as, for example, a ceramic, including alpha-alumina, aluminum-nitride, or a metal including steel, aluminum, and the like. Alternatively, the internal surfaces of the chamber body may be artificially roughened by grinding, polishing, sand blasting, etching, machining or other techniques that result in sufficiently rough internal surfaces of the chamber body 30. Still further, the internal surfaces of the chamber body may be conformally coated with a material such as, for example, sprayed or painted ceramic or metal to provide the roughened surfaces thereon such internal surfaces. In a preferred embodiment, the reaction chamber 30 comprises a roughened alpha-alumina or aluminum-nitride ceramic in combination with an aluminum metal chamber body 30.

Figure 2:
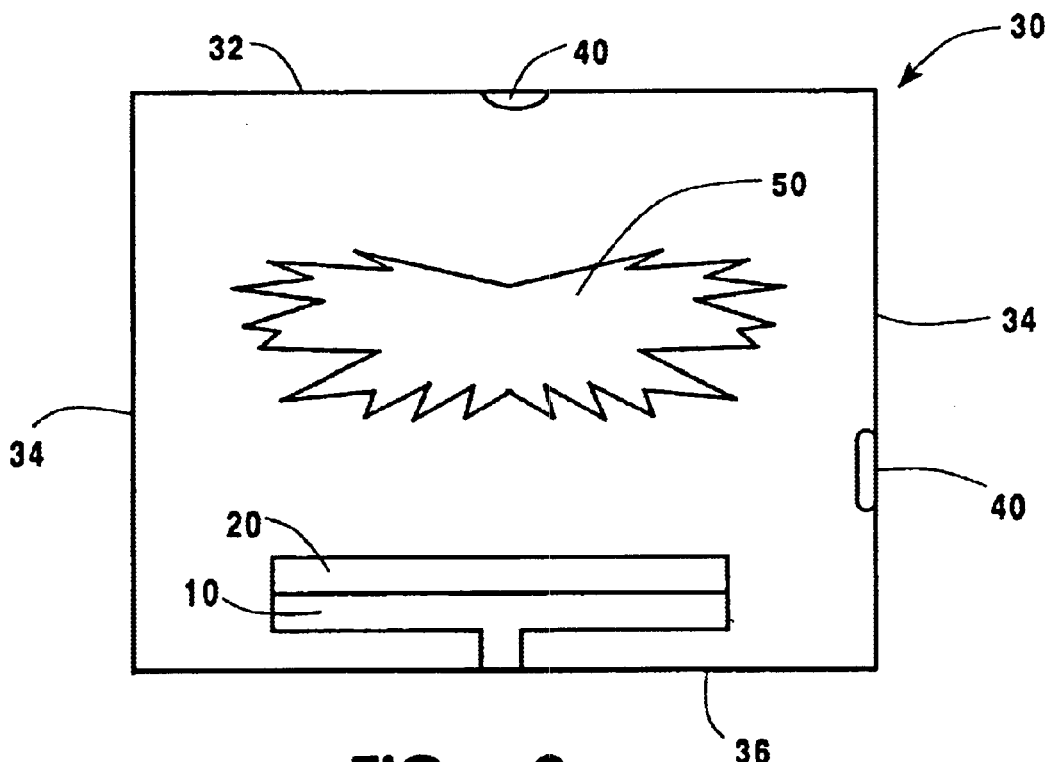
FIG. 2 illustrates a processing chamber in accordance with the invention having a differing shape and differing locations of the view ports than that of the processing chamber of FIG. 1 and showing a plasma emitted within the processing chamber as the radiation source.

The chamber body also has at least one optical view port or port entry or window 40 provided at any location along a perimeter of either the sidewalls 34 or the top portion 32 of the ceramic chamber body. Alternatively, a plurality of optical port entries 40 may be provided at a variety of locations along the perimeter of the sidewalls 34 and/or top portion 32 of the ceramic chamber body as shown in FIG. 2. As discussed further below, the optical port entry or window is used to receive and view radiation 66 reflected off the top portion 32 and sidewalls 34 within the chamber body for in-situ monitoring and controlling of the deposited film thickness. Accordingly, a plurality of potential locations may exist on the chamber body whereby the optical fibers may be pointed a variety of differing directions for collecting the reflected plasma emitted radiation for analysis to determine the film thickness. As shown in FIG. 1, the view port 40' depicted at the top portion 32 of the chamber is directly over the wafer so as to collect the reflected radiation in the shortest distance possible thereby improving signal to noise and result in a more accurate film measurement.

Preferably, the internal surface of the optical port entry or window 40 within the chamber body has a roughened surface. The inside surface of the optical view port is roughened so as to randomize directionality of incident and reflected radiation which eliminates intensity fluctuations due to film deposition onto the inside surface of the view port, as well as allowing for the continuous detection of the reflected radiation. The optical port entry may comprise a material that is both optically transparent and relatively inert to the types of plasma that are used in the deposition chamber. A relatively inert material is desired so that any aggressive gases or chemical plasmas within the reaction chamber do not react with the internal material of the optical port entry. The optically transparent port entry 40 may comprise a material including sapphire, alpha-alumina, yttrium aluminum garnet, and the like.

Figure 3A:
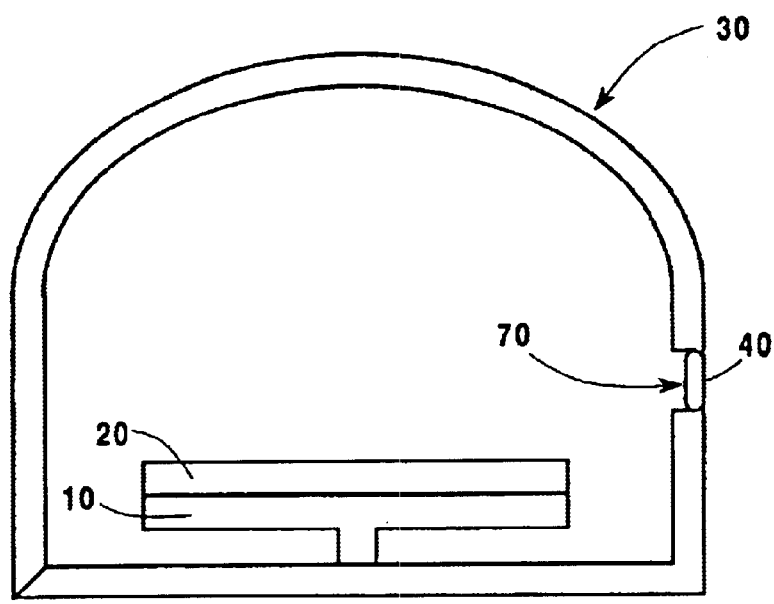
FIG. 3A illustrates, in accordance with the invention, the view ports may be a window retracted into a small opening or tube located at any location along the perimeter of the processing chamber.

Alternatively, as shown in FIG. 3A, to prevent deposition of the film onto the internal surface of the optical port entry, the port entry 40 may be a window retracted into a small opening or tube 70 located at any location along the perimeter of the chamber body 30. This would prevent significant film deposition on the inside of the optical viewing part or window by gases or plasma within the chamber. Tube 70 may have a diameter ranging from about 0.01 inches to about 0.5 inches whereby the window may be retracted or receded into the tube to a depth of about 0.2 inches to about 5.0 inches. In such an embodiment, as the plasma does not contact the internal surface of the port entry, optionally, the internal surface thereof need not be made of a material that has a roughened surface.

Figure 3B:
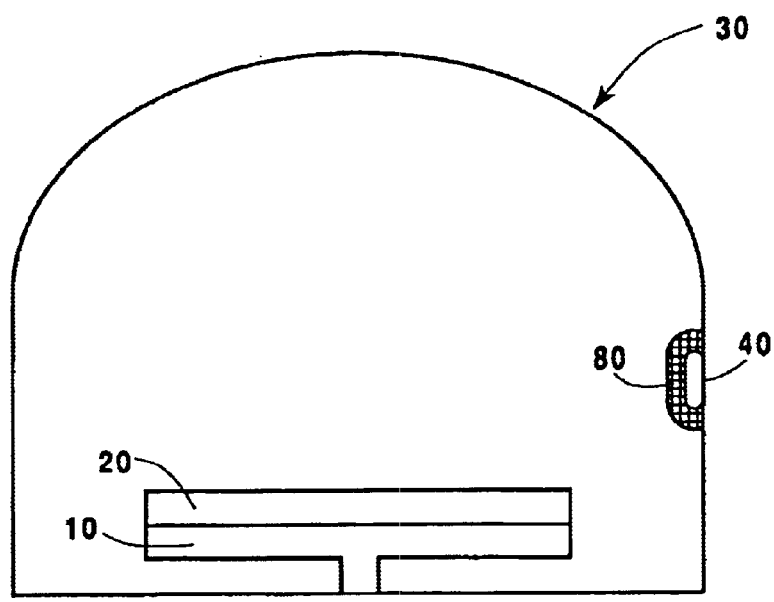
FIG. 3B illustrates an alternate embodiment of the view ports whereby a metal mesh screen or a bundle of small diameter tubes may be provided over the internal surface of the view port for protecting the internal optical lens of the port entry from deposition of a film thereon.

A still further embodiment of preventing the deposition of the film onto the internal surface of the optical port entry 40, as shown in FIG. 3B, is providing a protective means 80 including a fine metal mesh screen or bundle of small diameter tubes over the internal surface of the optical port entry. Wherein a fine mesh metal screen 80 is provided over the optical port, it may be made of a material such as aluminum or ceramic, so as not to react with any gases or plasmas within the chamber body, and having a pore diameter ranging from about 0.001 inches to about 0.2 inches. The protective means protect the internal optical lens of the port entry from deposition of a film thereon, thereby allowing the continuous and unobstructed view into the deposition chamber body for monitoring and controlling the deposition of the film onto the wafer surface.

In accordance with the invention, the roughened internal surfaces of the chamber and of the window or view port prevents any interference between the detected radiation and any film which may be deposited thereon the window or view port. Accordingly, the only radiation pattern viewed from within the chamber are the smooth reflected radiation patterns being reflected from the wafer surface and the internal roughened surfaces. In a further embodiment, the deposition on the window or optical component may be measured in a calibration using a ceramic or metal disk with a roughened surface whereby such ceramic or metal disk has the same diameter as the wafer having the film deposited thereon. In so doing, the contribution from the film deposited on the window may be mathematically compensated for using known calculations. Still further, the deposition on the window or optical component may be compensated for using known algorithms which require measuring both the deposited film thickness on the wafer versus the deposited film thickness on the inside roughened surface of the view port.

As illustrated, the wafer 20 is provided on the support pedestal 10 within the reaction chamber 30 for depositing a film on a surface 22 of the wafer. The instant invention may be used to deposit a variety of optically transparent films such as oxide-based or nitride-based films. For example, the invention may be used to deposit films including silicon oxide, fluorinated silicon oxide, phosphorus dope silicon oxide, boron doped silicon oxide, diamond like carbon, polymers and the like, as well as optically transparent nitride films such as silicon nitride, titanium nitride, tantalum nitride, carbon nitride and the like. Alternatively, the wafer 20 may be provided on the support pedestal 10 for etching a film off the wafer surface.

Figure 4:
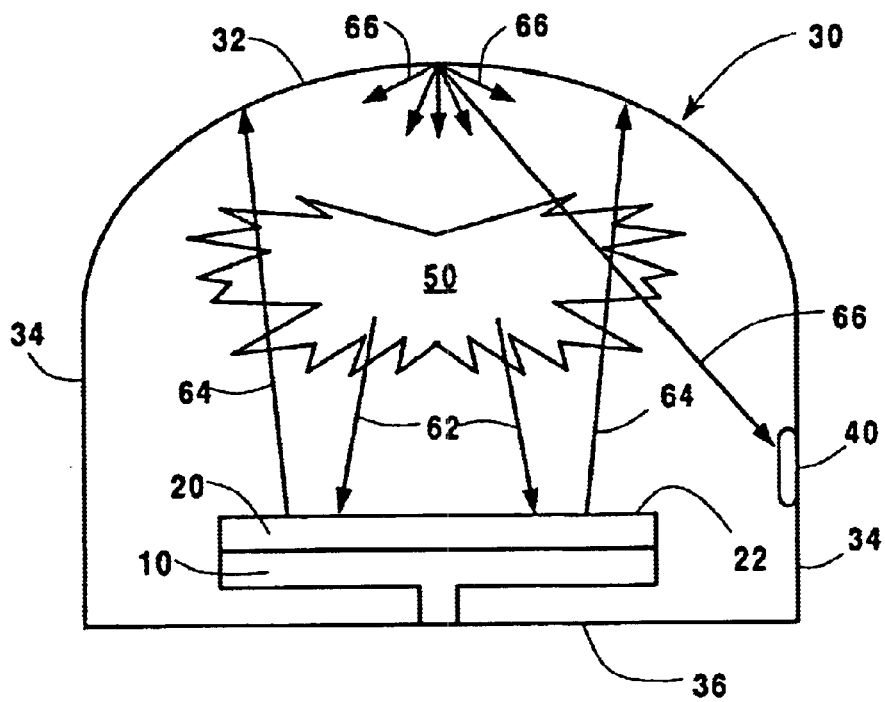
FIG. 4 illustrates a processing chamber of the invention including the processing chamber of FIG. 1 with a plasma therein as shown in FIG. 2 whereby the plasma emits radiation which is reflected off the wafer surface and then diffusely reflected off the internal roughened surfaces of the processing chamber and detected by the view port for analyzing a deposited film thickness in real-time.

As shown in FIGS. 2 and 4, in depositing or etching the film, a plasma 50 is emitted within the deposition tool during the deposition process. The plasma may be composed of radiation emitting gases, or ions, radical derivatives of these gases, such as for example, helium, neon, argon, krypton, xenon, oxygen, fluorine, silane, hydrogen, silicon and the like, as well as other known chemical species which are used in deposition processes for forming a film on a wafer surface. In applying the electrical source to the chamber, the atoms, molecules, or electrons of the gases or plasma are continuously excited to a higher energy state by the radio frequency or other energy source that is provided into the deposition tool. Such excited atoms, molecules, or electrons relax to a lower energy state and release the energy-difference as radiation that is specific to the type of atom, ion or molecule. In the preferred embodiment, the radiation emitted from the plasma 50 within the reaction chamber 30 is used as the radiation source in accordance with the invention whereby the radiation source is emitted continuously during the deposition process. In such embodiment, emissions from chemically inert gases such as helium, neon, argon, krypton, xenon are preferably chosen to ensure that chemical reactions, that would affect emission intensities and therefore the film thickness measurement, do not occur during the intensive heat changes which would negatively affect the emitted radiation.

Figure 5:
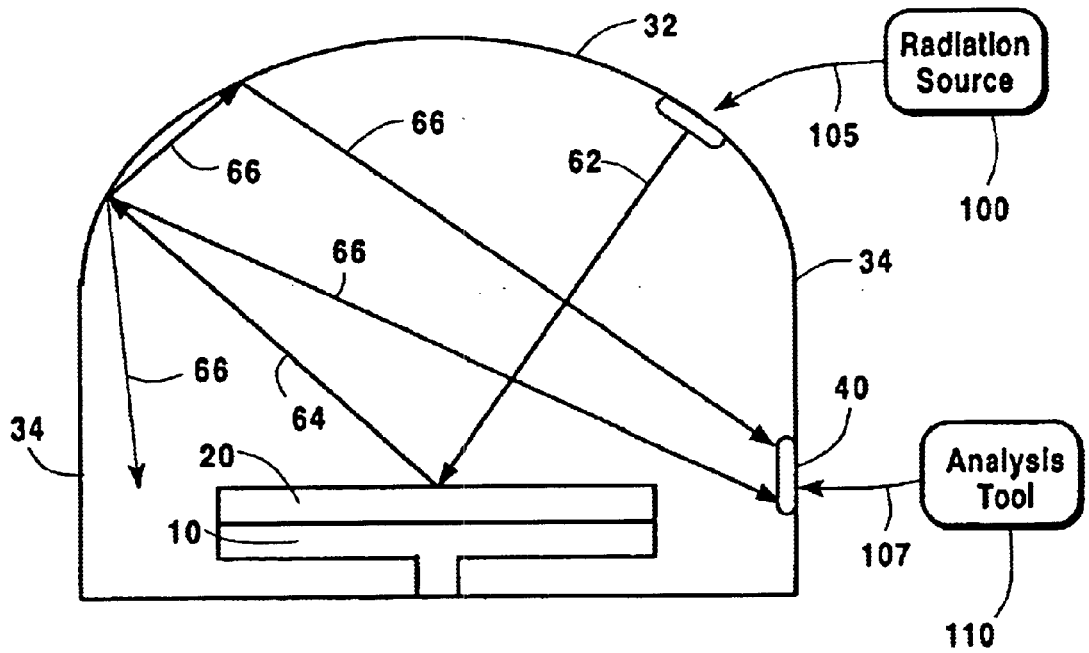
FIG. 5 illustrates an alternate embodiment of FIG. 4 whereby the radiation may be provided by an external radiation source into the processing chamber which is reflected off the wafer surface, diffusely reflected off the internal roughened surfaces of the processing chamber and detected by the view port for analyzing a deposited film thickness in real-time.

Alternatively, as illustrated in FIG. 5, wherein the plasma 50 within the chamber is not stable, i.e., does not have a stable energy state, fluctuations exist within the plasma or noise exists within the plasma, an external radiation source 100 may be coupled to the chamber via an optical fiber 105 whereby the external radiation source 100 is used as the radiation source in the invention. The external radiation source may include any type of ultra violet, visible, X-Ray or near infrared radiation source ranging from about 0.1 nm to about 1200 nm, such as X-Ray lamps, Fluorescent Lamps, Phosphorescence lamps, Halogen Lamps, High Intensity Discharge Lamps, Incandescent Lamps, Projection Lamps, Spectral Lamps, Laser, sun-radiation, fire-flies and the like. The external radiation source may be used to shine radiation into the chamber body 30 and directly onto the wafer surface 22. The radiation is emitted continuously and simultaneously during the deposition process to both control the deposition process and monitor the film thickness. In so doing, the radiation may be delivered from the radiation source to the chamber by means of an optical fiber as shown in FIG. 5.

Once the radiation source emitted from the plasma 50 or the radiation from the external radiation source contacts the wafer surface, the radiation interferes with the film being deposited thereon the wafer surface and then bounces off the wafer surface toward the roughened top portion 32 and the roughened sidewalls 34. As a result of the inside surfaces of the chamber walls being roughened, the radiation secondarily and diffusely reflects off the roughened inside surfaces of the chamber walls 32 and in all directions, as shown in FIG. 5, within the chamber whereby the radiation can then be viewed through the optical entry port 40, which may exist at any location along the top portion and sidewalls, and sent to an analysis tool 110 via an optical fiber 107 whereby the film thickness is calculated in real-time using the derivative of the atomic emission signal. Thus, in the invention the chamber body acts as an integrating sphere whereby the roughened surfaces of the top portion and sidewalls integrates all the radiation reflected off the surface of the wafer to disperse such radiation in all directions within the chamber. In viewing the radiation through the optical entry port 40, the effects of the interference of the radiation with the film can then be determined.

For ease of understanding the invention, reference will be made to FIG. 4 wherein the radiation source for the invention is emitted from the plasma 50. As illustrated, reference numeral 62 shows a first set of arrows which represent the average direction from which the radiation emitted from plasma 50 within the chamber body 30 is directed towards the wafer surface. Upon reflection of the radiation 62 off the wafer surface, radiation interferes with the film being deposited thereon. The amount of radiation 64 that reflects off the wafer, is a function of the film thickness present on the wafer surface. It reflects off the wafer at the same angle as it shines onto the wafer, however, in the opposite direction and towards the roughened top portion 32 and roughened sidewalls 34 of the chamber body 30. The reflective radiation 64 from the wafer then secondarily and diffusely reflects radiation 66 off the roughened top portion 32 and roughened sidewalls 34 in random directions so that radiation 66 is reflected in all directions within the chamber body.

As discussed above, the optical view port 40 may be located at a variety of locations along the perimeter of the chamber body, including locations that are above and/or below the wafer 20 within the chamber, as the reflected radiation 66 is directed in all directions within the deposition chamber. To obtain an optimal signal to noise detection, the optical view port 40 may be located at the top center of the top portion 32 as shown in FIG. 1. However, in the invention, the optical view port may be located above or below the location of the wafer, as well as at a location along the top portion 32 or the sidewalls 34 of the chamber as reflected radiation 66 may be detected from any location within the chamber body.

As shown in FIG. 4, the radiation 66 reflected off the roughened surfaces of the chamber body can be viewed through the optical port entry 40. Such radiation may be viewed using known techniques and analytical instrumentation including, for example, viewing radiation 66 with a spectrograph or a combination of a band-pass filter or color filter and radiation detector that detects the radiation over a wavelength range. The analytical instrumentation collects radiation 66 and determines small fluctuations in its intensity at specific wavelengths of emitted radiation. The total amount of reflected radiation 64 is the sum of the individual reflections from the radiation emitted by the plasma 62. Due to the natural wavelike character of radiation, the reflections from two inter-phases 64a and 64b may be either in-phase or out-of-phase depending on the difference in path length of the two reflections, whereby the optical path length depends on the optical film constants, the wavelength of radiation, the angle of incidence of the incoming radiation and the film thickness of the film. When in-phase, the reflections of the inter-phases 64a and 64b leads to constructive interference, resulting in a maximum intensity of reflected radiation 64. When out-of-phase, the reflections of the inter-phases 64a and 64b results in destructive interference or a minimum intensity of reflected radiation 64. In the instant invention, the incident angle of the reflected radiation 66 is a net vector resulting from the sum of all the individual components arriving from the plasma. Such resulting average incident angle may be determined using known calibration procedures that use known or predetermined film thickness on a wafer. Thus by knowing the average incident angle of the radiation, the film constants and choosing specific wavelengths mathematical models of varying complexity can be applied continuously throughout the instant invention as the deposition proceeds to determine the deposited film thickness at in-situ and in real time.

Accordingly, a sequence of events are carried out before the desired film thickness is obtained in the invention. In so doing, the intensity of specific wavelengths of radiation 66, which may alternatively increase and decrease with time as discussed above, is determined periodically about every 0.01 second to about 10 seconds. The derivative of such determined radiation intensity versus time plot goes through zero every time the intensity reaches either a maximum or a minimum. Once the zero stage is determined, analytical and software tools can lock onto such zero stage and a computer calculates the deposited film thickness at this zero stage or point using Snell's law or other known, more complex optical mathematics. Based on the calculated deposited film thickness at the zero stage, the software component determines the number of times or cycles that the zero stage must be repeated until the desired film thickness has been obtained. A signal is then sent out by the computer that calculates the deposited film thickness to the electrical source emitting tool for monitoring and controlling the deposition process. Alternatively, the film deposited film thickness may be calculated directly at any time, and not only when the radiation intensity goes through a maximum or a minimum, using other known sophisticated mathematical programs.

To obtain sufficient signal-to-noise for the radiation intensity versus time data, averaging of the radiation intensity measurements can be performed in real-time in the measurement itself, or mathematically, thereby providing more accurate or more reproducible film thickness results. Typically, in the invention, the real-time data may be delayed by the amount of averaging performed. Accordingly, the instant real-time calculations may include a delay ranging from about 0 seconds up to about 200 seconds, however, the delay is commonly about 1 second to about 20 seconds. Such delay typically occurs as a result of the time allotted or required to collect the radiation, average the data obtained, the computation of time and the time needed to transmit the data, i.e., the bit rate. In the instant invention, to prevent the delay from having an affect on the deposited film thickness, the deposition process may be stopped at a measured thickness that is lower than a desired film thickness, such that the resultant film thickness on the wafer equals or is close to the desired film thickness. Alternatively, the actual real-time film thickness may be predicted by extrapolation to allow stopping of the deposition process at the correct time.

Figure 6:
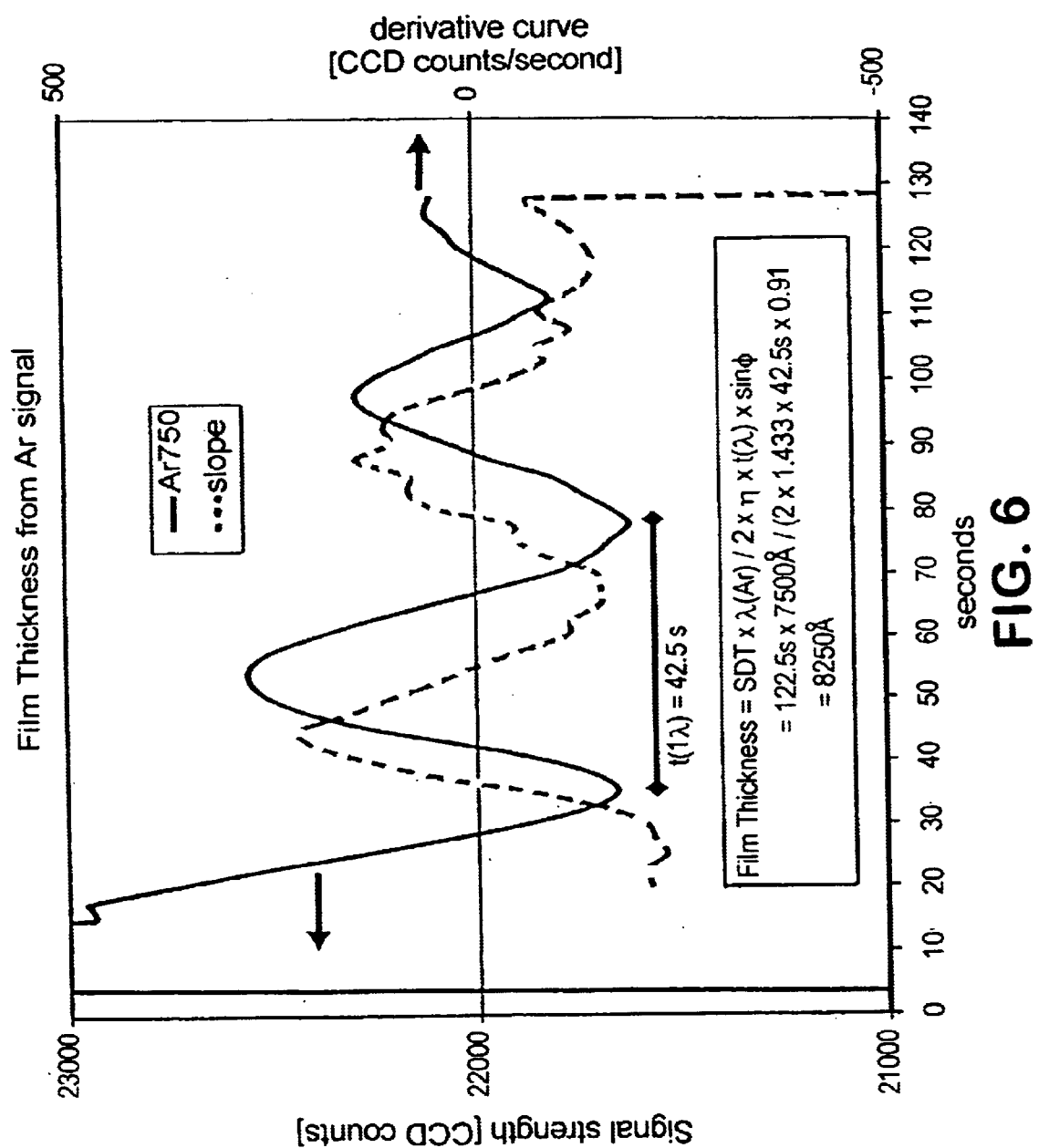
FIG. 6 illustrates a graphical representation of the instant invention showing a typical signal of an Argon emission whereby the operating conditions within the deposition chamber include the view port having roughened internal surfaces.
Figure 7:
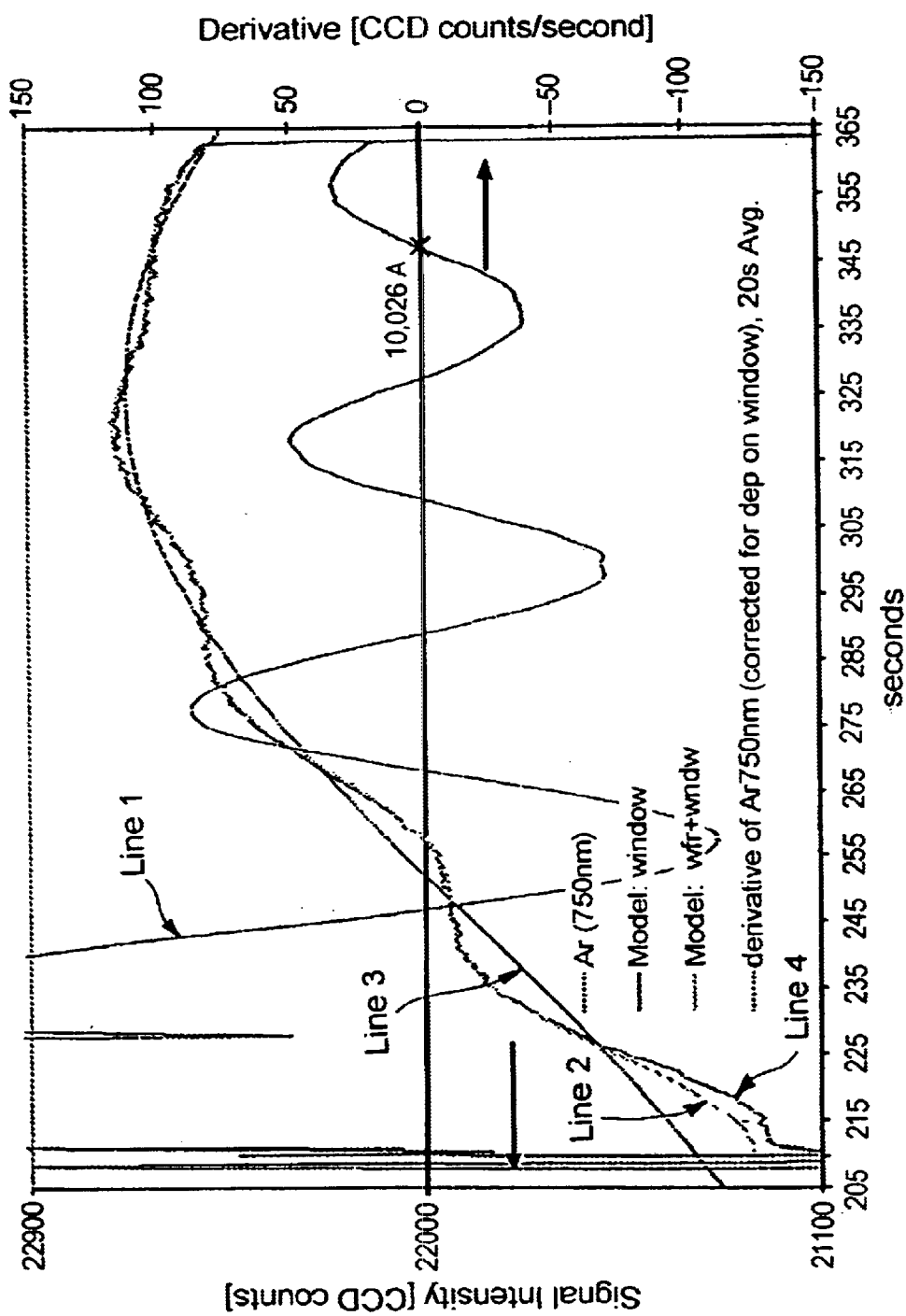
FIG. 7 illustrates another graphical representation of the instant invention showing a typical signal of an Argon emission whereby the operating conditions within the deposition chamber include the view port not having roughened internal surfaces.

For further ease of understanding the invention, FIGS. 6 and 7 illustrate two examples of a typical signal of an Argon emission. As shown, FIG. 6 illustrates a representative measurement of an Argon emission at 750 nm. The operating conditions within the deposition chamber in FIG. 6 include roughened internal surfaces of the view port 40, Argon at the wavelength ("$\lambda(Ar)$") of 750 Å, a refractive index of deposited film ("$\eta$") of 1.433, the deposition time ("SDT") of 122.5 seconds at the end of the deposition, the time between two minimum intensities ("$t(\lambda)$") of 42.5 seconds and the average angle of incident light onto the wafer ("$\phi$") of 65.5° (as determined by previous calibration). Reflected radiation 66 emitted by the Argon at 7480–7520 Å was collected from a view port located 5 inches below the wafer surface and the measured film thickness at the end of such deposition was determined in real-time to be 8250 Å.

Further as shown in FIG. 6, the curve for the left scale shows the emission intensity (in CCD counts) versus the elapsed time (in seconds) since the start of the measurement. The first plotted vertical solid line (very steep rise in emission intensity) corresponds to the time the deposition started and the second plotted, dotted vertical line (very steep drop in intensity) corresponds to when the deposition finished. Between these two vertical lines, the emission intensity of the argon (the solid line) oscillates whereby the amplitude decays due to the variation of the angles of incident light and as a result having increasingly randomized phase-differences of the reflected light as the path length between the light reflected from the film surface and from the wafer substrate increases. As illustrated, the curve of the derivative of the Argon emission intensity at 750 nm, between the start and finish of the deposition, passes zero several times.

As discussed above, the points at which the derivative curve passes zero do not correspond to the exact maximum or minimum intensities of the Argon emission due to the averaging performed for these calculations. In accordance with the invention, the light intensity reaches a maximum when the path difference of the reflected light from the reflected light between the film surface and wafer surface is a multiple of the wavelength of the used light. The light intensity reaches a minimum when the path difference of the reflected light from the reflected light between the film surface and wafer surface is half the wavelength of the used light or one half plus a multiple of the wavelength of the used light. It is at these points that the deposited film thickness may be calculated in real-time.

Likewise, FIG. 7, illustrates a representative measurement of an Argon emission at 750 nm. However, the operating conditions within the deposition chamber in FIG. 7 include that the internal surfaces of the view port 40 not be roughened. In such example, the model window (line 3) represents the mathematical determination of the contribution of film deposition onto the internal surface of the view port. It was determined that the mathematically determined result, graphically demonstrated as "Model: wfr+wndw" (line 2) has a good fit with the measured data graphically demonstrated as "Ar(750 nm)" (line 4). As graphically demonstrated as "derivative of Ar750 nm (corrected for dep. on window), 20 s Avg." (line 1), it can be viewed that the reflected radiation 66 emitted by Argon at 7480–7520 Å, which was collected from a view port located 5 inches below the wafer surface, that the above calculated results gave a deposited film thickness of 10,026 Å at the last node and the measured film thickness at the end of the deposition was extrapolated and the desired film thickness was determined in real-time to be 11,000 Å.

Accordingly, the instant invention uses a radiation source emitted from a plasma within the deposition chamber, or alternatively an external radiation source, in combination with the roughened internal surfaces of the chamber body 30 as a secondary reflecting surface to both control and monitor in-situ film deposition thickness directly as the deposition process occurs and updates results in real-time. The chamber body 30 is used as part of the optical instrument itself whereby the roughened internal surfaces reflect the radiation from the radiation source and the radiation that reflected off the wafer surface in random directions in the chamber so that such randomly reflected radiation is used to measure the film thickness on the wafer within the chamber. The roughened surfaces have the effect of randomizing the effects of interference of light reflected off the film surface and the chamber wall underneath the film. The resulting fluctuation on the measured light intensity is therefore due to the more directionally well defined reflected radiation from the wafer. Likewise, the roughened internal surface of the optical entry port 40 also collects and reflects radiation in all directions and not contributing to fluctuations of light intensity transmitted through the window. Alternatively, as discussed in detail above, the optical entry port can be located or manipulated such that no deposition occurs on the internal surface thereof.

Advantageously, the instant real-time, in-situ determination of film thickness stops the film deposition, with relatively low cost equipment, at a time when the desired film thickness has been reached using a feedback loop of film thickness information back to the deposition tool controls, thereby preventing deposition of an incorrect film thickness. It also allows for the deposition of a film to be within about 10 Å to about 200 Å of a desired film thickness within a real-time modeling paradigm. Also, the need to dial in different process-parameters every time you need a different film or film thickness is eliminated, as the instant invention is adapted for active feedback and wafer recognition, thereby greatly simplifying the process set-up and the processing steps, as well as eliminating the need for test wafers. The invention eliminates the need for transporting wafers to another chamber for determining deposited film thickness and wasting valuable processing time, as well as eliminates the potential of film deposition drift from wafer to wafer, i.e., it eliminates film thickness deviation from wafer to wafer.

Furthermore, should any problem arise in the deposition process which may negatively affect the film measurement, the instant in-situ measurement system and method are adapted to immediately recognize such problems and stop the process before wafer product quality is affected. These problems may be immediately recognized by analysis of the emission intensity data obtained for the deposited film thickness measurement. Such unusual signal behavior generally is a symptom of hardware or process problems including, but not limited to, arcing, incorrect gas flow settings, incorrect power settings, inconsistent power delivery, and the like. Upon detection of such abnormalities, fault messages are delivered to the tool software alerting the operator of the problem and automatically triggering a stop to the process to prevent miss-processing of product. Thus having the instant in-situ film thickness measurement equipment results in significant cost savings for the semiconductor electronics, optic circuit or opto-electronics fabrication industries.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for measuring film thickness on a substrate in a processing chamber both in real-time and in-situ comprising:

providing a processing chamber having roughened internal surfaces;

emitting a radiation within said processing chamber, said radiation directed toward and contacting a wafer surface having a film being processed thereon;

said radiation reflecting off said wafer surface and directing toward and contacting said roughened internal surfaces;

said reflected radiation diffusely reflecting off said roughened internal surfaces; and collecting said radiation diffusely reflected off said roughened internal surfaces to measure a thickness of said film being processed thereon said wafer surface.

2. The method of claim 1 wherein said roughened internal surfaces within said processing chamber have a variety of shapes selected from the group consisting of dome-shaped, hemispherical, cylindrical, oval, square, cylindrical square, cylindrical parabolic and combinations thereof.

3. The method of claim 1 wherein said roughened internal surfaces are provided by a method selected from the group consisting of grinding, polishing, sand blasting, etching, and machining the internal surfaces of said processing chamber.

4. The method of claim 1 wherein said roughened internal surfaces are provided by conformally coating internal surfaces of said processing chamber with a material having a naturally occurring roughness.

5. The method of claim 1 further including at least one optical view port provided at any location along a perimeter of said processing chamber for collecting said radiation diffusely reflected off said roughened internal surfaces to measure said thickness of said film.

6. The method of claim 5 wherein said at least one optical view port has roughened internal surfaces to randomize directionality of incident and said diffusely reflected radiation.

7. The method of claim 5 wherein said at least one optical view port comprises a window retracted into a small opening located at any location along the perimeter of said processing chamber.

8. The method of claim 5 wherein said at least one optical view port further includes a protective means over an internal surface of said at least one optical view port to prevent deposition of said film thereon said internal surface of said at least one optical view port.

9. The method of claim 1 wherein said film being processed comprises depositing a film thereon said wafer surface.

10. The method of claim 1 wherein said film being processed comprises a etching a deposited film thereon said wafer surface.

11. The method of claim 1 wherein said radiation is emitted from a plasma generated within said processing chamber.

12. The method of claim 1 wherein said radiation is emitted into said processing chamber from an external radiation source.

13. A method for measuring deposited film thickness on a substrate in a deposition chamber both in real-time and in-situ comprising:

providing a processing chamber having roughened internal surfaces;

providing at least one optical view port at any location along a perimeter of said processing chamber;

providing a radiation source;

emitting a radiation within said processing chamber from said radiation source, said radiation directed toward and contacting a wafer surface having a film being deposited thereon;

said radiation reflecting off said wafer surface and directing toward and contacting said roughened internal surfaces;

said radiation diffusely reflecting off said roughened internal surfaces;

collecting said radiation diffusely reflected off said roughened internal surfaces using said at least one optical view port; and analyzing a thickness of said film across said wafer surface based on said collected diffuse radiation.

14. The method of claim 13 wherein said processing chamber comprises a deposition tool selected from the group consisting of a physical vapor deposition, a chemical vapor deposition, a plasma enhanced chemical vapor deposition and a high density plasma deposition.

15. The method of claim 13 wherein a degree of roughness average of said roughened internal surfaces at least equals a wavelength of said deposited film.

16. The method of claim 13 wherein said at least one optical view port may be located below said wafer surface for collecting said diffusely reflected radiation.

17. The method of claim 13 wherein said at least one optical view port may comprise a material selected from the group consisting of sapphire, alpha-alumina and yttrium aluminum garnet.

18. The method of claim 13 further including a plurality of optical view ports located at a variety of locations along said perimeter of said processing chamber both above and below said wafer surface.

19. The method of claim 13 wherein said radiation source comprises a plasma generated within said processing chamber.

20. The method of claim 19 wherein said plasma comprises a radiation emitting gas selected from the group consisting of helium, neon, argon, krypton, xenon, oxygen, fluorine, nitrogen, nitrogen monoxide, carbon monoxide, chlorine, bromine, hydrogen, silicon and ions thereof.

21. The method of claim 13 wherein said radiation source comprises an external radiation source emitting radiation into said processing chamber.

22. The method of claim 21 wherein said external radiation source comprises a source selected from the group consisting of ultra violet, visible, X-Ray and near infrared radiation source.

23. The method of claim 13 wherein said film may be deposited to a thickness ranging from about 50 Å to about 20,000 Å.

24. The method of claim 13 wherein said deposited film comprises a film selected from the group consisting of silicon oxide, fluorinated silicon oxide, phosphorus dope silicon oxide, boron doped silicon oxide, diamond-like carbon, polymers, silicon nitride, titanium nitride, tantalum nitride and carbon nitride.

25. The method of claim 13 wherein said collected diffuse radiation has a wavelength ranging from about 0.1 nm to about 5000 nm.

26. The method of claim 13 wherein said thickness of said film across said wafer surface is analyzed by calculating in parallel a plurality of wavelengths from a plurality of emissions reflecting off said wafer surface and diffusely reflecting off said roughened internal surfaces.

27. A processing chamber for measuring film thickness on a substrate in real-time and in-situ comprising:

a chamber body;

roughened internal surfaces of said chamber body;

at least one optical view port located at any location along a perimeter of said chamber body; and a radiation source, wherein radiation is emitted from said radiation source, reflected off a wafer surface and secondarily and diffusely reflected off said roughened internal surfaces of said chamber body whereby said diffusely reflected radiation is collected by said at least one optical view port to measure a thickness of a film across said wafer surface.

28. The apparatus of claim 27 wherein said roughened internal surfaces have a shape selected from the group consisting of dome-shaped, hemispherical, cylindrical, oval, square, cylindrical square, cylindrical parabolic and combinations thereof.

29. The apparatus of claim 27 wherein said chamber body comprises a material having a naturally occurring surface roughness to provide said roughened internal surfaces.

30. The apparatus of claim 27 wherein said roughened internal surfaces comprise a material having a naturally occurring surface roughness conformally coating on internal surfaces of said chamber body.

31. The apparatus of claim 27 wherein said at least one optical view port has roughened internal surfaces to randomize directionality of incident and said diffusely reflected radiation.

32. The apparatus of claim 27 wherein said at least one optical view port comprises a window retracted into a small opening located at any location along the perimeter of said chamber body.

33. The apparatus of claim 27 wherein said at least one optical view port further includes a protective means over an internal surface of said at least one optical view port to prevent deposition of said film thereon said internal surface of said at least one optical view port.

34. The apparatus of claim 27 further including a plurality of optical view ports located at a variety of locations along said perimeter of said chamber body both above and below said wafer surface.

35. The apparatus of claim 27 wherein said radiation source comprises a plasma generated within said chamber body.

36. The apparatus of claim 27 wherein said radiation source comprises an external radiation source emitting radiation into said chamber body.

* * * * *